P. J. MUELLER.
DRIVING MECHANISM.
APPLICATION FILED AUG. 31, 1911.
1,032,696.
Patented July 16, 1912.
2 SHEETS—SHEET 1.
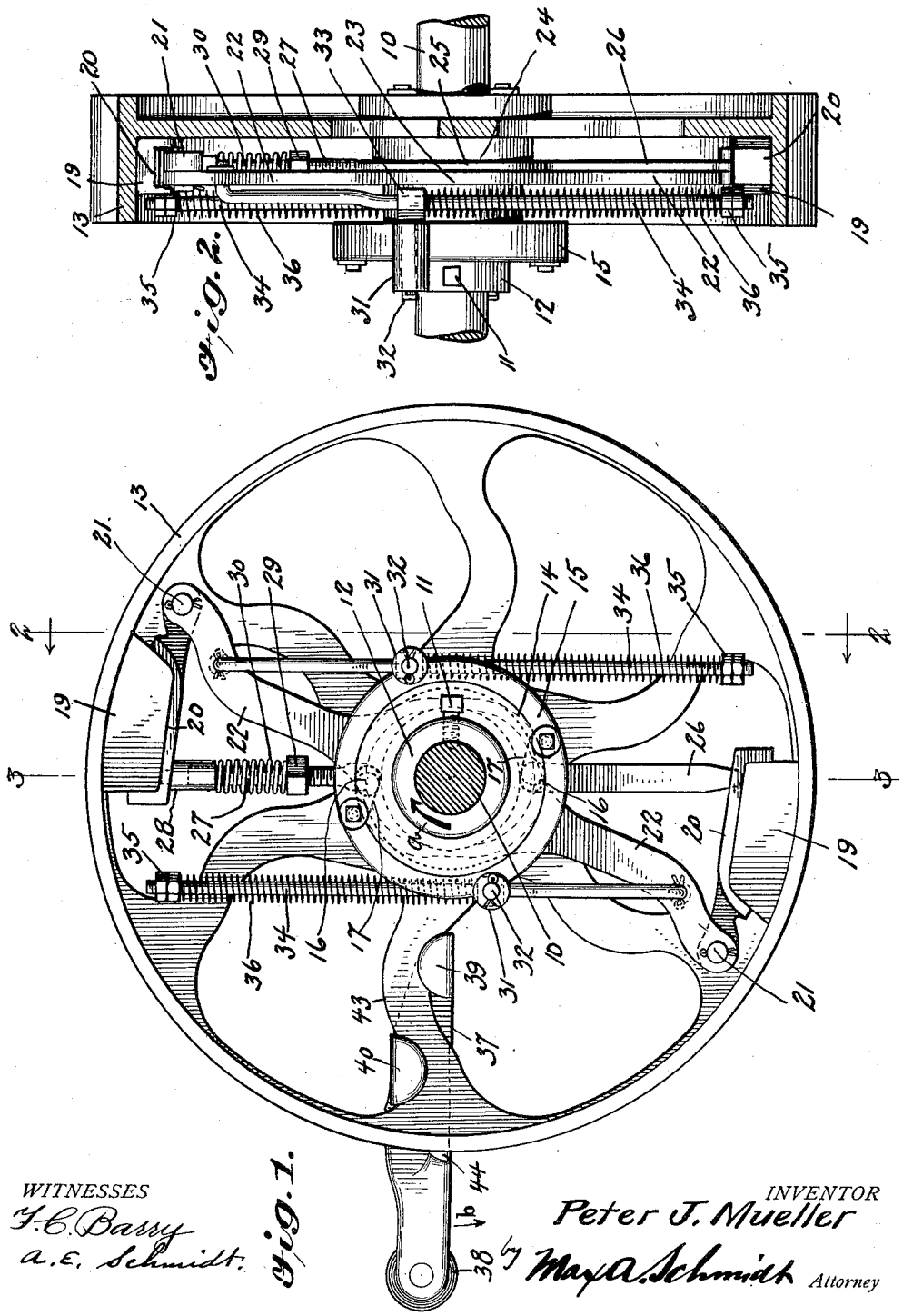
WITNESSES
F. C. Barry
A. E. Schmidt
INVENTOR
Peter J. Mueller
by Max A. Schmidt Attorney

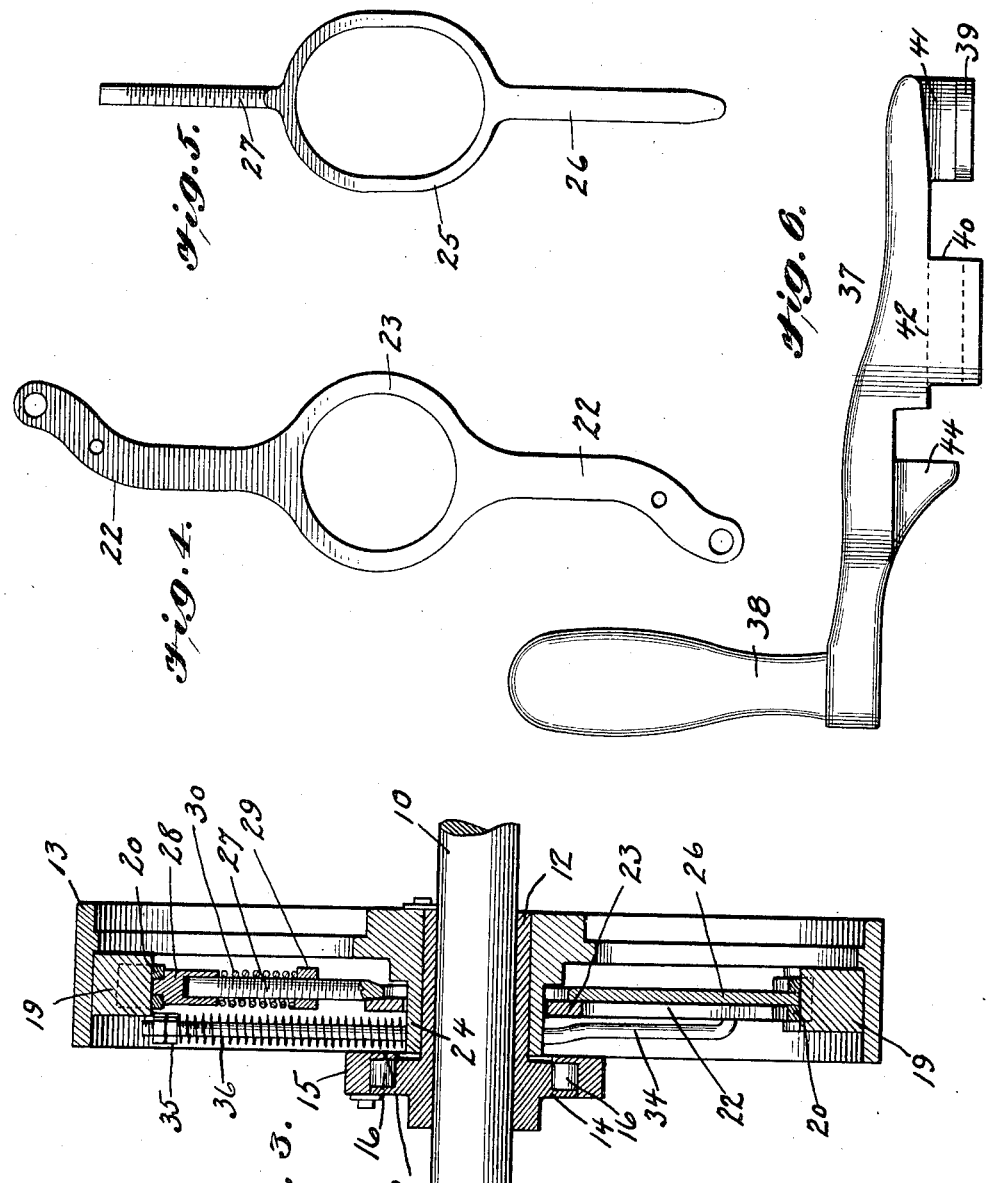

UNITED STATES PATENT OFFICE.

PETER J. MUELLER, OF MAQUOKETA, IOWA.

DRIVING MECHANISM.

1,032,696.  Specification of Letters Patent.  Patented July 16, 1912.

Application filed August 31, 1911. Serial No. 647,019.

*To all whom it may concern:*

Be it known that I, PETER J. MUELLER, a citizen of the United States, residing at Maquoketa, in the county of Jackson and State of Iowa, have invented certain new and useful Improvements in Driving Mechanism, of which the following is a specification.

The mechanism which is the subject of the present invention is designed more particularly for use in connection with cream separators which are driven by internal-combustion engines, although it is not limited to such use.

It is the object of the invention to provide an improved yieldable driving mechanism in order to protect the separator or other driven element from jerks and irregularities in the speed of the engine.

Another object is to provide a mechanism which does not stop the driven element suddenly when the engine stops, but which allows said element to run free and slow down to a gradual stop.

The invention also has for its object to provide in a mechanism of the kind stated a novel construction and arrangement of parts to be hereinafter described and claimed.

In order that the invention may be better understood, reference is had to the accompanying drawings, in which—

Figure 1 is an elevation of the mechanism. Figs. 2 and 3 are sectional views on the lines 2—2 and 3—3 of Fig. 1. Figs. 4 and 5 are elevations of certain details to be hereinafter described. Fig. 6 is an elevation of a crank handle adapted to be connected to the driven member.

Referring specifically to the drawing, 10 denotes a drive shaft which is supported in any suitable manner and is connected to the engine, which latter has not been shown as it forms no part of the present invention. To the shaft 10 is made fast, by a set screw or other suitable means 11, a sleeve 12 on which is loosely mounted the driven member, said member being a pulley 13 which is belted to the separator or other element (not shown) to be driven. The sleeve 12 is formed with a collar 14 which is loosely encircled by a ring 15, said collar and ring being connected by a pawl-and-ratchet. The pawls are rollers 16 which seat in recesses 17 in the periphery of the collar, and are adapted to be forced outward and jammed against the inner periphery of the ring by the inclined walls of the recesses, the inclination of said walls being such that a driving connection between the collar and ring is had when the former is rotating in one direction. In case of reversal or stoppage of the collar, the ring is disconnected and runs idle. The outer ends of the recess are closed, and the ring has a continuous flange 18 extending inward from its inner periphery, between which flange and the closed ends of the recesses the rollers 16 are located, whereby they are prevented from slipping out of the recesses endwise. Suitable means are also provided to prevent endwise separation of the collar and ring.

The inner periphery of the rim of the pulley 13 has a clutch surface which is engageable at diametrically opposite points by clutch members comprising wood or fiber shoes 19 carried by blocks 20, said shoes being removable so that they may be renewed when worn. The blocks 20 are pivotally connected at one of their ends, as indicated at 21, to the extremities of arms 22 extending from a ring 23 which loosely encircles the hub 24 of the pulley 13. The free ends of the blocks 20 are engaged by a device which presses the shoes against the clutch surface of the pulley rim with sufficient pressure to bind said shoes thereagainst and cause the rotation of the pulley when the arms 22 are in motion. This device is a yoke 25 which passes loosely around the pulley hub 24 and has two diametrically opposite arms 26 and 27, respectively, the extremity of the arm 26 extending loosely into a socket in one of the blocks 20, and the other block being engaged by a plug 28 fitting at one of its ends in a socket in said other one of the blocks 20. The other end of the plug has an axial bore into which loosely extends the extremity of the arm 27. Between the last-mentioned end of the plug and an abutment 29 on the arm 27 is interposed a spring 30, said spring being coiled around the arm, which latter is screw-threaded to receive the abutment 29, the latter being a nut. By adjusting the abutment nut on the arm 27, the tension of the spring 30 may be varied. The shoes 19 are pressed against the pulley rim with equal tension which is readily regulated by adjusting the nut 29.

The driving connection for the clutch shoes is a yielding one, and comprises the following means: On the outer periphery of the ring 15 are diametrically opposite lugs 31 in which are loosely mounted, so as to be free to rock therein, spindles 32 each having one of its projecting ends formed with a head or enlargement 33. The spindles extend parallel to the axis of the shaft 10, and the heads thereof have transverse openings through which slidably pass rods 34. One of these rods is connected at one of its ends to one of the arms 22, and the other rod is connected at one of its ends to the other arm 22. The arms, at the points where the connections with the rods are made, have lateral bends, at the terminals of which the connections with the shoe blocks 20 are made. On the other ends of the rods are adjustably mounted abutments 35 which are nuts, the rods being screw-threaded to receive the same. Between these nuts and the heads 33 are located springs 36 the latter being coiled around the rod. The tension of the springs 36 can be readily regulated by adjusting the nuts 35 on the rods.

It will be evident from the foregoing that when the ring 15 is driven in the direction of the arrow $a$ in Fig. 1 through the pawl-and-ratchet mechanism, the motion will be transmitted through the rods 34 to the arms 22, and as said arms carry the clutch shoe blocks 20, the pulley 13 will be set in motion. The springs 36 form a yielding connection between the ring 15 and the rods 34 and take up all jars or jerks due to uneven running of the engine, and the motion is therefore transmitted smoothly and evenly to the separator or other driven element. The rods are located on opposite sides of the axis of the mechanism and they pull in opposite directions. If the engine should stop or be reversed, the pawl-and-ratchet mechanism releases the ring 15, the pulley then runs idle and the separator or other driven element continues to run until its momentum is spent. There is consequently no sudden stoppage of the separator or other driven element, and the latter slows down gradually until it comes to a stop. The pulley is also provided with a crank handle which is removably connected thereto. The handle comprises a shank 37 and a grip 38. On one side of the shank are lugs 39 and 40 having grooves 41 and 42, respectively. The shank is adapted to be placed against the face of one of the pulley spokes 43 with one edge of the spoke fitting in the groove 41, and the other edge in the groove 42. The shank has a third lug 44 which is so spaced from the lug 40 that the pulley rim fits snugly between said lugs 40 and 44. The inner and outer periphery of the pulley rim are therefore gripped as well as opposite edges of the spoke, in view of which the handle is rigidly connected when it is operated to turn the pulley in the direction of the arrow $b$. When operated in the opposite direction it will be released.

I claim:

1. The combination of a driving member, a driven member having a clutch surface, clutch members engaging said surface, a support to which the clutch members are pivoted, a spring-actuated connection between the free ends of the clutch members for placing the same in frictional engagement with the clutch surface, and a yielding driving connection between the driving member and the support of the clutch members.

2. The combination of a driving member, a driven member having a clutch surface, clutch members engaging said surface, a support to which the clutch members are pivoted, a pair of oppositely extending arms between the free ends of the clutch members, one of said arms engaging one of said members, a plug having a bore in one end into which the other arm loosely extends, the other end of the plug engaging the other clutch member, an abutment on the last-mentioned arm, a spring between the abutment and the plug, and a driving connection between the driving member and the support of the clutch members.

3. The combination of a driving member, a driven member having a clutch surface, clutch members engageable with said surface, a support to which the clutch members are pivoted, rocking spindles carried by the driving member, a slide rod carried by each spindle and connected at one of its ends to the support of the clutch members, abutments on the other ends of the rods, and springs between the abutments and the spindles.

In testimony whereof I affix my signature in presence of two witnesses.

PETER J. MUELLER.

Witnesses:
R. E. STEWART,
HENRY A. MULLER.

---

Copies of this patent may be obtained for five cents each, by addressing the "Commissioner of Patents, Washington, D. C."